United States Patent [19]

Musgrave

[11] 4,291,480

[45] Sep. 29, 1981

[54] INTERACTING LEAF SPRINGS

[76] Inventor: Daniel D. Musgrave, 8201 Caraway St., Cabin John, Md. 20731

[21] Appl. No.: 84,623

[22] Filed: Oct. 12, 1979

Related U.S. Application Data

[63] Continuation-in-part of Ser. No. 3,664, Jan. 15, 1979, Pat. No. 4,258,495.

[51] Int. Cl.³ .......................... F41C 25/02; F16F 1/22
[52] U.S. Cl. ......................................... 42/50; 267/165
[58] Field of Search ....................... 42/50, 49, 6, 7, 18, 42/22; 267/164, 165, 158

[56] References Cited

U.S. PATENT DOCUMENTS

| | | | |
|---|---|---|---|
| 3,964,199 | 6/1976 | Musgrave | 42/50 |
| 3,999,319 | 12/1976 | Musgrave | 42/50 |
| 4,205,474 | 6/1980 | Musgrave | 42/50 |
| 4,252,302 | 2/1981 | Musgrave | 42/50 |
| 4,258,495 | 3/1981 | Musgrave | 42/50 |

*Primary Examiner*—Charles T. Jordan

[57] ABSTRACT

Interacting leaf springs which can be assembled in a minimum space while in a relaxed condition. When the assembled springs are to exert thrust, some leaves are moved relative to others so as to cause mutual interference which tends to expand the assembly in a predetermined direction. One suggested use for this invention is in cartridge magazines for firearms.

19 Claims, 10 Drawing Figures

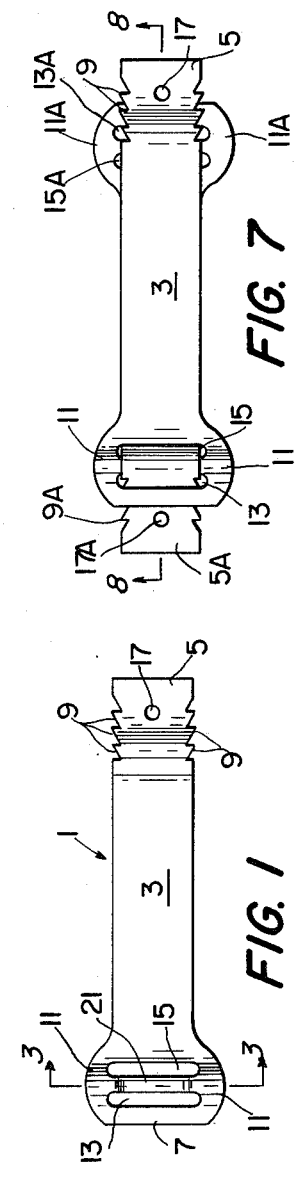
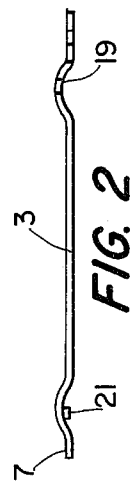
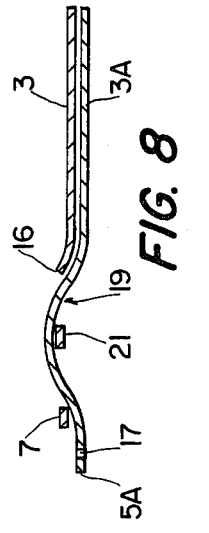
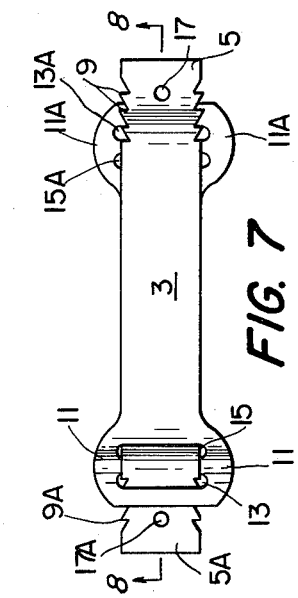
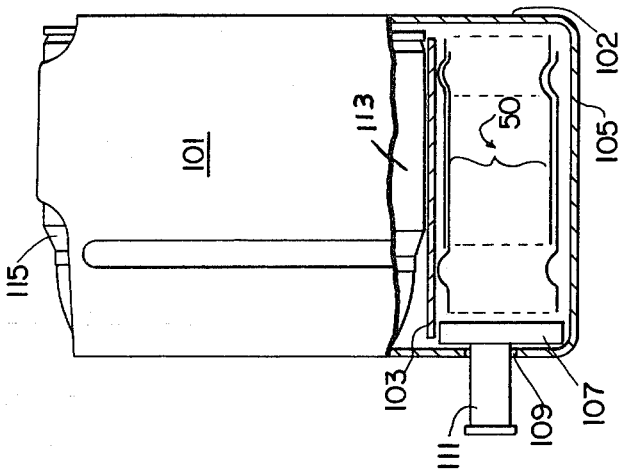
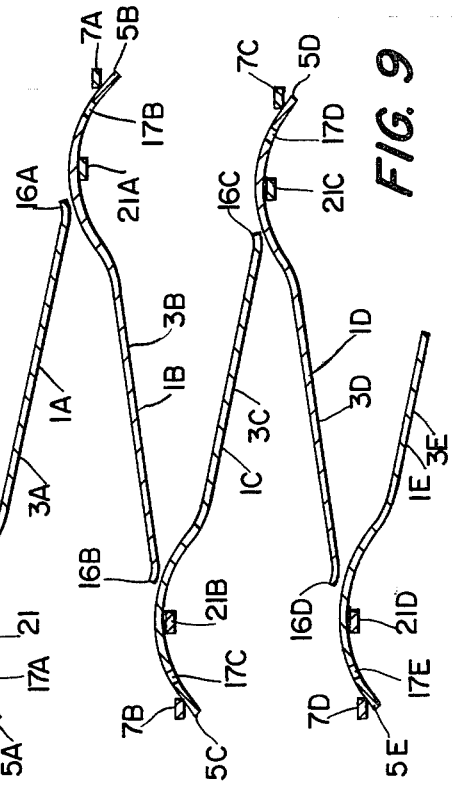
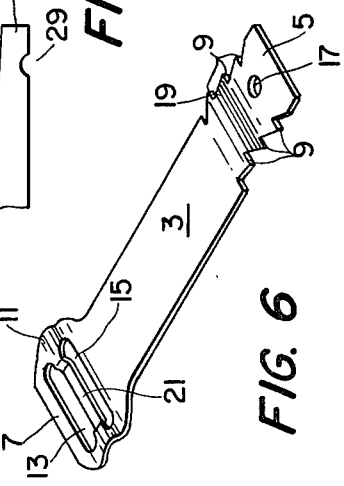

INTERACTING LEAF SPRINGS

This application is a continuation-in-part of application Ser. No. 3,664 filed Jan. 15, 1979 now U.S. Pat. No. 4,258,495, and entitled Interacting Springs.

Many types of equipment include springs which must stand by in a stressed condition for long periods of time. An obvious limitation on such equipment is the possibility that the springs may lose their resilience. A special instance of this problem is the cartridge magazine for firearms, which therefore is usually not filled until use is imminent. This requires separate storage and handling of the cartridges and the magazines.

It would be a considerable advantage if the magazines could be filled at a central point, wrapped in a protective material, and not unwrapped until just prior to use. The shelf life of carefully made ammunition is normally twenty years or more, but the typical wire coil magazine spring will not endure, under load, for such a length of time.

It is an object of this invention to provide an interacting leaf spring assembly which can be installed in a minimum space in a no-load condition, and can quickly be adjusted to a loaded condition.

This and other objects of the present invention will be apparent upon reference to the following specification, taken in connection with the accompanying drawings, wherein:

FIG. 1 is a top view of a leaf spring.

FIG. 2 is a side view of the spring shown in FIG. 1.

FIG. 3 is a cross-section taken in the plane indicated by line 3—3 on FIG. 1.

FIG. 4 is an alternate detail relating to FIG. 3.

FIG. 5 is an alternate detail relating to FIG. 1.

FIG. 6 is a perspective view of the spring shown in FIG. 1.

FIG. 7 is a top view showing how two or more leaf springs can be assembled in a stack.

FIG. 8 is a sectional view of one end of the stack in FIG. 7, taken in the plane indicated by line 8—8 on FIG. 7.

FIG. 9 is a sectional view of a stack of interacting leaf springs, the stack being expanded.

FIG. 10 is a side view, partly sectioned, of a cartridge magazine including a stack of leaf springs embodying this invention.

It is desired to point out that the illustrations are for purposes of disclosure, and that they should not be construed as limitations on the invention. No particular cartridge magazine is shown, and the invention is not limited to use with such magazines. It can be used with various types of mechanical equipment.

Referring now to the drawings in detail, FIG. 1 shows a leaf spring generally indicated by numeral 1. The spring includes a longitudinal portion 3 and two dissimilar end portions, 5 and 7. End portion 5 has a series of teeth 9 formed along its edges. End portion 7 has an ear 11 formed on two of its edges and it also has transverse slots 13 and 15 formed through it. Formed through end portion 5 is a hole 17.

Spring 1 is not entirely flat. It has an arcuate portion 19 formed near end portion 5 as may be seen in FIG. 2. In FIG. 2 it will also be seen that end portion 7 is also given a slight arcuate profile. However transverse rib 21 which is positioned between slots 13 and 15, may remain substantially in the same plane as longitudinal portion 3.

This can be accomplished by forming the rib substantially as shown in FIG. 3, where the rib is shown bent down from ears 11. If desired, ears 11 can be bent over upon themselves as shown in FIG. 4, which is an alternate for FIG. 3. In FIG. 4 the bent end of ear 11 is indicated by numeral 23. Bending the ears might be necessary if the width of the spring between ears is considered excessive for some intended use.

FIG. 5 shows an alternate detail for end portion 5. Formed in the end portion is a slit 25 which divides the end portion into two portions 5A and 5B. Notches 27 and 29 are formed in end portions 5A and 5B respectively.

FIG. 6 is a perspective view of substantially the same spring as appears in FIGS. 1, 2, and 3. It should be understood that slight differences in geometry can be tolerated in the fabrication of the described spring so long as certain essential features are included. These essential features will be described hereinafter.

FIG. 7 shows a plurality of springs similar to spring 1, and assembled in a stack. Each individual spring has its end portion 5 inserted through slots 13 and 15 of an adjacent spring. To make this clear, the parts of the uppermost spring in the stack are numbered exactly as in FIGS. 1, 2, and 3. The corresponding parts in the next adjacent spring are given the same numbers with the suffix A added, as may be seen in FIG. 8. Additional springs in the stack shown in FIG. 9 use the corresponding numbers with suffixes B, C, D, and E. But the stack shown is merely exemplary as the quantity of leaf springs employed in actual practice may vary to suit circumstances.

When a plurality of leaf springs is assembled into a stack, adjacent springs are engaged together by inserting end portion 5 of one spring through slots 13 and 15 of another spring as disclosed in FIG. 7 and FIG. 8. The end portion is so inserted that rib 21 is positioned substantially within arcuate portion 19. In this relationship the engaged springs can remain relaxed. It is readily apparent that a plurality of leaf springs can be so engaged, each successive engagement being alternately at one or the other end of the stack. In this condition the leaf springs can be stacked closely so as to occupy a minimum of space.

It will be noted in FIGS. 7 and 8 that the ends of springs in the stack are staggered, and that each spring is oriented oppositely to the spring or springs adjacent to it. Depending upon the number of springs in the stack, half, or approximately half, of that number will have their ends protruding somewhat from either end of the stack.

FIG. 10 shows a cartridge magazine for a firearm including a casing 101, a cartridge follower 103, a floor 105, and a pusher block 107. The block includes a lug 111 which passes through a hole 109 in the front wall of the casing. A cartridge 113 rests on the follower and another cartridge 115 is partly visible at the feed end of the magazine.

Between follower 103 and floor 105 is installed a stack of interacting leaf springs, indicated by the arrow extending from numeral 50. Stack 50 is not shown in detail, but it comprises a plurality of leaf springs assembled as described hereinbefore for FIG. 7 and FIG. 8. Therefore the stack is relaxed.

Pusher block 107 is positioned near one end of stack 50, and the other end of the stack is disposed near the rear wall 102 of casing 101. It is assumed that a column of cartridges extends between cartridges 113 and 115.

As the spring is relaxed, the magazine can thus be stored for the life of the contained cartridges. Not only is spring fatigue avoided, but there is no significant thrust on the casing, which is an important consideration when plastic casings are employed and stored for long periods in unfavorable environments.

When it is desired to use the magazine in a firearm the stack of springs is stressed by pushing lug 111 into casing 101 via hole 109. This pushes block 107 against stack 50. As the ends of the individual springs in the stack are staggered, the block pushes only against those portions protruding at one end of the stack. This causes one-half of the stack to move relative to the other half which is prevented from moving by wall 102 of the casing.

The result is that the protruding ends of some leaves at each end of the stack are moved inward relative to the stack whereby the ends of all leaves become aligned. This changes the engagement between adjacent leaves in the stack from that shown in FIG. 8 to that shown in FIG. 9, which will now be explained in detail.

In FIG. 9 it will be seen that end portion 7 of spring 1 is substantially aligned with end portion 5A of spring 1A. Because of the profile of portion 5A it must bend between end portion 7 and rib 21. This bending is facilitated by hole 17A which reduces the resilience of spring 1A at the proper place. Spring 1A is also stressed between rib 21 and edge 16 of slot 15, the said edge being numbered in FIG. 8 and FIG. 9. This stress is such that it will tend to pivot longitudinal portions 3 and 3A apart as shown in FIG. 9. The longitudinal portions can thus act as levers with edges such as 16 serving as fulcrums. The effect will be similar at each place in the stack where two leaf springs are engaged. Thus the assembly will tend to expand in a predetermined direction.

As considerable friction will be encountered when so changing the engagement between leaf springs it may be advisable to coat them with a lubricant.

When the springs are engaged as shown in FIG. 9, teeth 9 can prevent any tendency to return to the relationship shown in FIG. 8. To accomplish this, the teeth may be slightly upset or twisted so that they can engage an edge of one of the transverse slots and serve as a detent.

An alternate form of detent is shown in FIG. 5. A slot 26 divides the end of the spring into end portions 5A and 5B in which are formed notches 27 and 29 respectively. The notches are so located as to engage rib 21 when the engagement relationship is correct. Of course, ends 5A and 5B are arranged to spring apart.

FIG. 9 shows the stack or assembly as it would appear when free to expand. In FIG. 10 however, the assembly would not be free to expand when engagement of its component leaves is changed from that shown in FIG. 8 to that shown in FIG. 9. The stack being confined between follower 103 and floor 105, each spring in the stack will therefore be stressed and distorted. When cartridges are removed from the magazine the follower will be able to rise and permit the stack to expand to substantially the condition shown in FIG. 9. But it should be pointed out that the drawings are simplified for purposes of disclosure, and that complex geometrical forms will appear in the stack in actual practice.

The transverse slots which constitute the means for engagment of adjacent leaves also act as guide means when leaves are moved inter se. The ends of the leaves serve as means for limiting such movement. Arcuate portions 19 serve as activation means to stress the assembly when expansion is desired. The leaves could also be provided with stiffening ribs, a common practice in the sheet metal art.

What I claim is:

1. A resilient leaf adapted for installation in an interacting spring assembly, said leaf including: engagement means comprising a plurality of slots extending transversely across a longitudinal axis of said leaf; lever means; fulcrum means; activation means; and detent means.

2. A leaf as set forth in claim 1 wherein said lever means comprises a longitudinal portion of said leaf.

3. A leaf as set forth in claim 1 wherein said fulcrum means comprises an edge of one of said plurality of slots.

4. A leaf as set forth in claim 1 wherein said activation means comprises an arcuate portion of said leaf.

5. A leaf as set forth in claim 1 wherein said detent means comprises at least one tooth formed on an edge of said leaf.

6. A leaf as set forth in claim 1 wherein said detent means comprises a plurality of teeth formed along an edge of said leaf.

7. A leaf as set forth in claim 6 wherein said teeth are distorted.

8. A leaf as set forth in claim 1 and made of sheet metal.

9. A leaf as set forth in claim 1 wherein a hole is formed through said leaf near one end thereof.

10. A leaf as set forth in claim 1 wherein one end thereof is split.

11. A leaf as set forth in claim 1 wherein said activation means can interact with another component of said assembly.

12. A leaf as set forth in claim 11 wherein said component is another similar leaf.

13. A leaf as set forth in claim 11 wherein said leaf and said component can interact in a slideable relationship.

14. An interacting spring assembly comprising a stack of resilient leaves, each leaf in said stack including: engagement means comprising a plurality of slots extending transversely across a longitudinal axis of said leaf; lever means; fulcrum means; activation means; and detent means.

15. An assembly as set forth in claim 14 wherein said leaves are adapted for engagement inter se.

16. An assembly as set forth in claim 15 wherein said leaves are adapted for engagement inter se in a first relationship wherein said leaves are relaxed and in a second relationship wherein said leaves are stressed.

17. An assembly as set forth in claim 16 which is adapted to expand in a predetermined direction when said leaves are stressed.

18. In a cartridge magazine in combination: a casing for storing cartridges, said casing including a floor and an exit port; a follower slideable in said casing and adapted for urging said cartridges toward said port; an interacting spring assembly engaging said follower and said floor and comprising; a stack of resilient leaves, each leaf in said stack including: engagement means comprising a plurality of slots extending transversely across a longitudinal axis of said leaf; lever means; fulcrum means; activation means; and detent means.

19. A combination as set forth in claim 18 wherein said leaves are adapted for engagement inter se in a first relationship wherein said leaves are relaxed and in a second relationship wherein said leaves are stressed, said assembly being adapted to expand in a predetermined direction when said leaves are stressed.

* * * * *